United States Patent Office 3,501,174
Patented Mar. 17, 1970

3,501,174
ROTARY UNION
Gordon Richard Walker, Leamington Spa, England, assignor to Filton Limited, Leamington Spa, England
Filed Aug. 21, 1968, Ser. No. 754,202
Claims priority, application Great Britain, Aug. 23, 1967, 38,909/67
Int. Cl. F16l 27/00
U.S. Cl. 285—279
8 Claims

ABSTRACT OF THE DISCLOSURE

A rotary fluid-conveying union comprising a casing of high-strength metal castings and a hollow shaft member journalled in a bearing in said casing, the casing and hollow shaft member having a rotary sliding contact seal interposed therebetween the elements of which have opposed smooth flat sealing faces transverse to the axis of rotation which run one on the other, one of the elements being a floating element and being urged against the other element which is rotatable, the rotatable element being secured to said shaft so as to rotate therewith and having a thrust face engaging a thrust bearing separate from said journal bearing.

---

Figure 1:
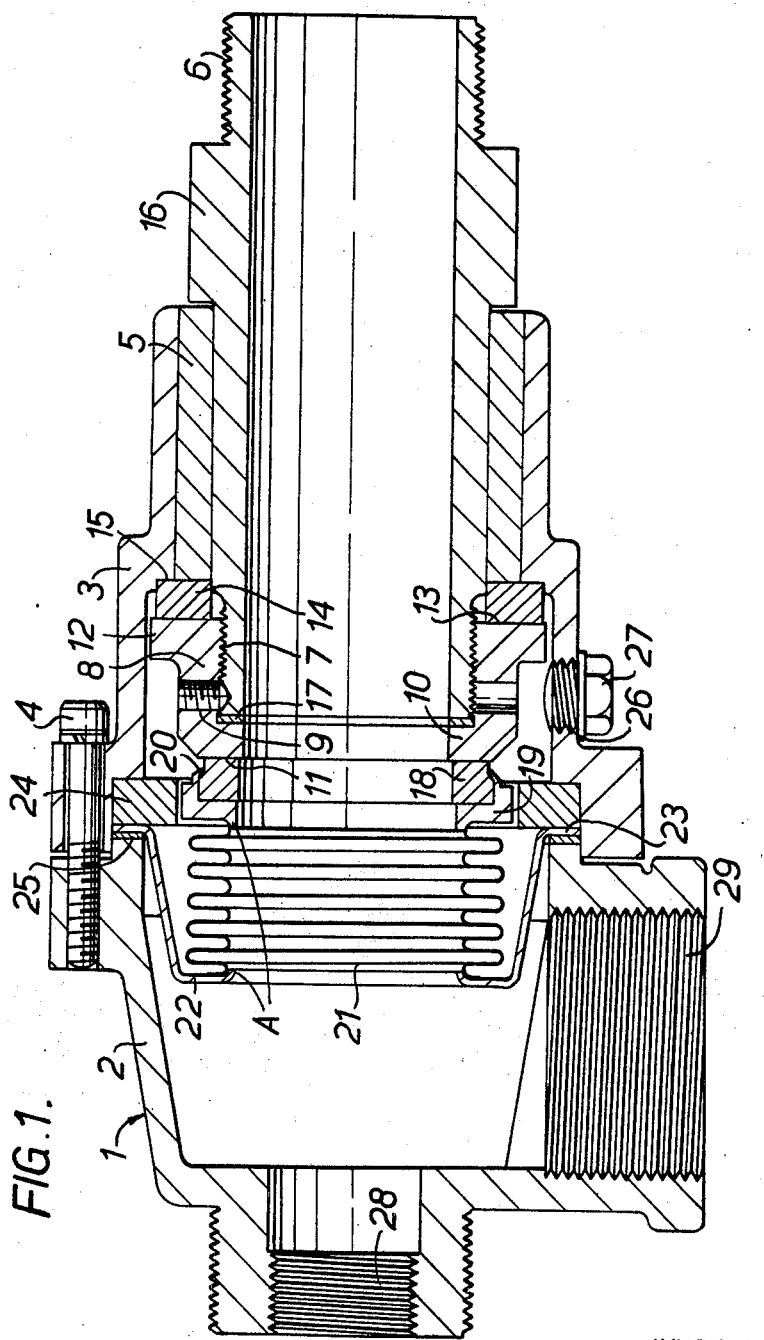

The present invention relates to rotary fluid-conveying unions, e.g., of the kind used for connecting a fluid pipe or pipes to a rotary member such as a hollow roll to or from which fluid is to be conducted, comprising a casing and a hollow shaft member rotatable relatively thereto, these members having interposed therebetween a rotary sliding contact seal the elements of which have opposed smooth flat sealing faces transverse to the axis of rotation which run one on the other, one of the elements of the contact seal being a floating element and being pressed against the other element which is rotatable. Such a union is hereinafter referred to as a "rotary union of the kind described."

The invention provides a rotary union of the kind described wherein a journal bearing is provided in said casing for rotatably supporting said shaft and wherein the rotatable element of said contact seal is secured to one end of said shaft so as to rotate therewith and has a thrust face concentric with and parallel to the sealing face thereof, which thrust face bears against a thrust bearing which is separate from said journal bearing and is interposed between said thrust face and the casing and/or a part associated with the casing.

In known arrangements the thrust bearing and journal bearing have been formed integrally and this has meant that when one of the bearings has worn (usually the thrust bearing since this is most affected by wear) both bearings have had to be replaced. In the arrangement, according to the present invention either the thrust bearing or the journal bearing can be replaced independently of the other. Moreover, in known arrangements, the sealing face of the rotatable element of the contact seal and said thrust face are formed on separate elements whereas in the arrangement according to the present invention they are formed on one and the same element thus enabling said faces to be more easily produced concentrically and parallel with one another.

The rotatable element of the contact seal may comprise a cylindrical ring threaded onto the inner end of said shaft and having an inwardly extending annular flange at one end thereof the outer side face of which comprises said sealing face and an outwardly extending annular flange at the other end thereof the outer side face of which comprises said thrust face. Preferably said shaft has an external screw-threaded portion spaced from the inner end thereof with which an internally screw-threaded portion of said cylindrical ring co-operates and said ring is locked on said shaft by means of a lock screw contained in a screw-threaded radial bore in said ring which tightly engages an unthreaded portion of said shaft between the inner end thereof and said screw threaded portion thereof. An annular sealing ring or gasket may be interposed between the end of said shaft and the internal shoulder provided by said inwardly extending annular flange.

In order that the weight and physical size, and hence the journal bearing load, of the rotary union according to the present invention may be reduced as much as possible the casing is preferably formed from high strength castings such as spheroidal graphite cast iron or stainless steel instead of grey iron as has hitherto been the practice, and such casing may be provided with an internal annular shoulder which supports said thrust bearing. Said journal bearing may be located between said thrust bearing and an annular radial projection on said shaft.

The floating element of the contact seal may be connected to one end of a bellows member which floatingly supports it and urges it towards the rotatable element, the other end of the bellows member being connected to an annular support which is in turn supported by the casing. Alternatively, said floating element may be supported in any other known or suitable manner, e.g., as by means of a known mechanical or diaphragm type of seal.

Where a bellows member as aforesaid is provided the means connecting said floating element to the bellows and the said support member where it is connected to the bellows are preferably shaped to closely fit over internal end crests of the bellows member so as to obviate the need for complex assembly jigs as has hitherto been the case.

An access port may be provided in said casing whereby access may be had to said lock screw.

Figure 2:
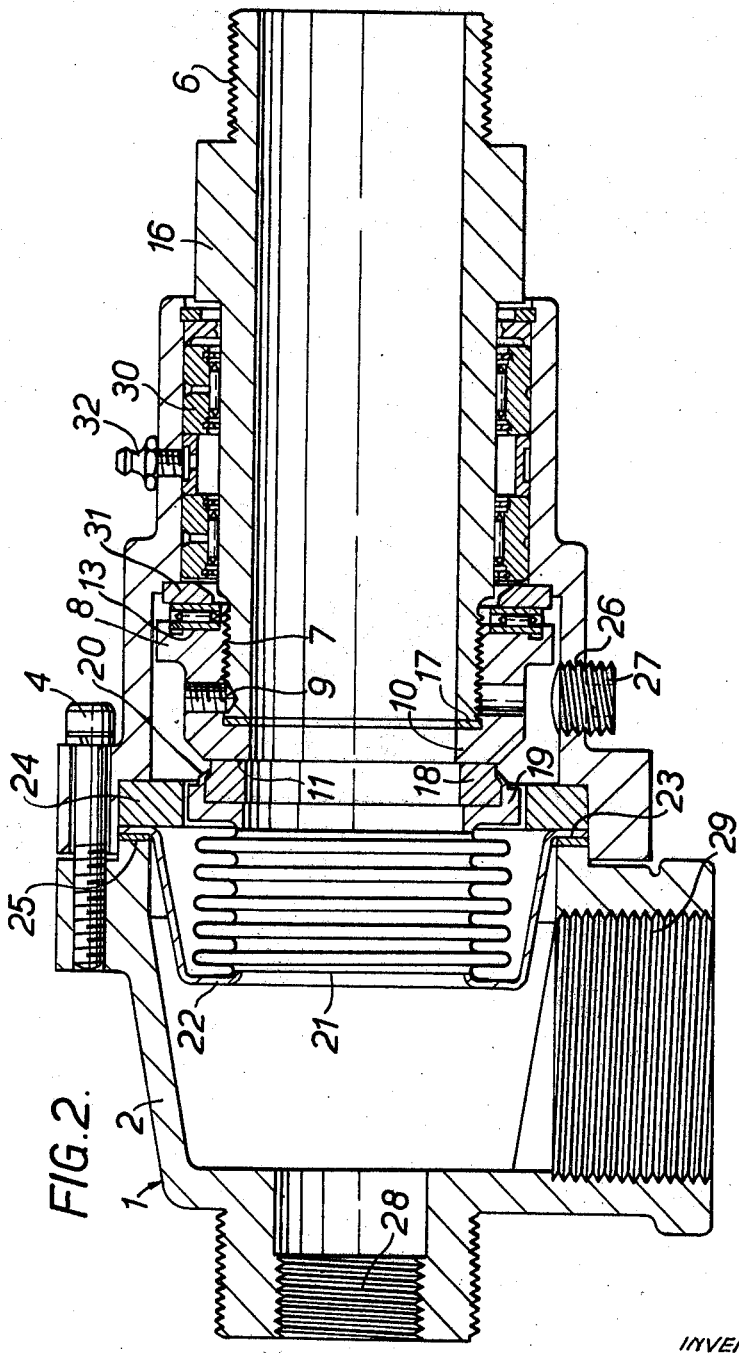

In order that the invention may be the more readily understood reference will hereinafter be made, by way of example, to the accompanying drawings in which:

FIG. 1 is a cross-sectional elevation of one embodiment of a rotary union according to the present invention, and FIG. 2 is a cross-sectional elevation of another embodiment.

The rotary union illustrated in FIGURE 1 comprises a casing 1 which is preferably formed from two high strength castings 2, 3 of spheroidal graphite cast iron or stainless steel. Said castings 2, 3 are bolted together by means of a plurality of bolts 4, only one of which is shown, to form the casing 1.

A journal bearing 5 mounted in one end of casing 1 rotatably supports a hollow shaft member 6 which is externally screw-threaded at 7 inwardly of its inner end. A cylindrical ring 8, which comprises the rotatable element of a rotary contact seal, is threaded onto the inner end of the hollow shaft 6 and is locked thereon by means of a lock screw 9 which passes through a threaded bore in the cylindrical ring 8 and engages the hollow shaft 6 between the inner end of the shaft 6 and the screw-thread 7 thereon so that no damage will be caused to the screw-thread 7 by the lock screw 9.

The cylindrical ring 8 has an inwardly extending annular flange 10 at one end thereof the outer side face 11 of which comprises one sealing face of the rotary contact seal and has an outwardly extending annular flange 12 at the other end thereof the outer side face 13 of which comprises a thrust face which engages and slides on an annular thrust bearing 14 supported by an annular shoulder 15 provided internally of the casing 1. As will be seen the journal bearing 5 is separate from the thrust bearing 14 and is located between the bearing 14 and an annular enlargement 16 on the hollow shaft 6.

An annular sealing ring or gasket 17 is inserted between the inwardly extending annular flange 10 of ring 8 and the inner end of shaft 6.

The floating element of the rotary contact seal comprises a ring 18 of carbon or the like mounted in a carrier 19 as by rolling the material of the carrier 19 over an annular shoulder on the ring 18 as shown at 20. Alternatively ring 18 may be held by conventional means such as soldering or gluing. Carrier 19 is mounted on one end of a bellows member 21 the other end of which is connected to an annular support member 22 which is in turn supported by the casing 1 by clamping the annular flange 23 thereof between the parts 2 and 3 of the casing. As shown at A in FIG. 1 the carrier 19 and annular support member 22 are shaped to closely fit over internal end crests of the bellows member so as to locate the carrier 19 and annular support member 22 relative to the bellows member prior to soldering or brazing or otherwise securing them to the bellows member, so avoiding the necessity for complicated assembly jigs.

A guide ring 24 is mounted in the casing around the carrier 19 and a sealing gasket 25 is interposed between casing part 2 and the flange 23 of annular support member 22.

An access port 266, which is normally closed by a removable plug 27, is provided in order that access may be had to the lock screw 9. This port also serves another useful function in that, with the port open, any slight leakage between the sealing faces of the rotary contact seal which may occur when pressure testing the completed union can be quickly detected.

Two inlets 28, 29 are provided whereby the rotary union may be connected, e.g., into a fluid line or lines. If only one of these inlets is used then the other will be plugged.

The journal bearing 5 and thrust bearing 14 may be of any desired or suitable kind and may, for example, be of carbon requiring no lubrication or of a material such as bronze with oil lubrication.

Alternatively the journal bearing may be a needle roller bearing and the thrust bearing a needle roller or ball thrust bearing, both with oil or grease lubrication. Such an arrangement is shown in FIG. 2, in which like parts have been given like reference numerals. As will be seen the embodiment illustrated in FIG. 2 corresponds with that shown in FIG. 1 except that the journal bearing 5 has been replaced by a needle roller journal bearing 30 and the thrust bearing 14 has been replaced by a needle roller bearing 31, the thrust face 13 of the cylindrical ring 8 having been suitably machined so as to form one race of the bearing 31.

A nipple 32 is provided for lubrication of the bearings 30 and 31.

What is claimed is:

1. A rotary fluid-conveying union comprising a casing, a journal bearing in said casing, a hollow shaft member journalled in said bearing, a rotary sliding contact seal interposed between said casing and said member, the elements of said rotary sliding contact seal having opposed smooth flat sealing faces transverse to the axis of rotation which run one on the other, one of the elements of the rotary sliding contact seal being secured to one end of said shaft so as to rotate therewith and the other element of the rotary sliding contact seal being a floating element, resilient means carried by said casing for urging said floating member into sealing contact with said one element, thrust bearing separate from said journal bearing on which said one element bears to axially locate said hollow shaft member, and an internal annular shoulder in said casing supporting said thrust bearing.

2. A rotary fluid-conveying union according to claim 1, the said one element of the rotary sliding contact seal comprising a cylindrical ring threaded onto the inner end of said shaft and having an inwardly extending annular flange at one end thereof the outer side face of which flanged and comprises the sealing face and an outwardly extending annular flange at the other end thereof the outer side face of which outwards flanged end comprises a thrust face.

3. A rotary fluid-conveying union according to claim 1, said shaft having an external screw-thread spaced from the inner end thereof and said one element of the rotary sliding contact seal comprising a cylindrical ring having an internal screw-thread which co-operates with the external screw-thread on said shaft, a lock screw being contained in a screw-threaded radial bore in said ring, said lock screw tightly engaging an unthreaded portion of said shaft between the inner end thereof and said external screw-thread to lock the ring to the shaft.

4. A rotary fluid-conveying union according to claim 1, wherein said thrust bearing is a roller bearing one race of which is comprised by said one element.

5. A rotary fluid-conveying union according to claim 1, wherein said thrust bearing is a roller bearing seating on said annular shoulder.

6. A rotary fluid-conveying union according to claim 1, wherein said journal bearing is a roller bearing.

7. A rotary fluid-conveying union including a casing comprising high-strength metal castings, a journal bearing in said casing, a hollow shaft member journalled in said bearing, a sliding rotary contact seal between said casing and said member, the elements of said contact sealing having opposed smooth flat sealing faces transverse to the axis of rotation which run one on the other, one of the elements of the rotary sliding contact seal including a cylindrical ring secured to said shaft so as to be rotatable therewith and having an inwardly extending annular flange at one end thereof the outer side face of which comprises a said sealing face and an outwardly extending annular flange at the other end thereof the outer side face of which outwards flange is concentric with and parallel to the said sealing face and comprises a thrust face, an annular ring comprising the other member of the contact seal, a bellows member mounted in said casing and floatingly supporting said annular ring, a thrust bearing on which said thrust face bears to axially locate said hollow shaft member, an internal annular shoulder in said casing supporting said thrust bearing, and an annular radial projection on said shaft, the said journal bearing being located in said casing between said thrust bearing and said annular radial projection on said shaft.

8. A rotary fluid-conveying union according to claim 7, comprising an annular support member one end of which is clamped by the casing and the other end of which is connected to one end of said bellows member, a support ring which carries said annular ring connected to the other end of the bellows member, the support member and said support ring each being provided with an annular curved surface which closely fits over and supports internal end crests of the bellows member.

References Cited

UNITED STATES PATENTS

| | | | |
|---|---|---|---|
| 2,088,418 | 7/1937 | King | 308—174 X |
| 2,182,263 | 12/1939 | Probert | 285—134 X |
| 2,381,432 | 8/1945 | Bratton | 285—226 X |
| 2,407,745 | 9/1946 | Jacobson | 285—226 X |
| 2,418,653 | 4/1947 | McCormack | 285—226 X |
| 2,805,087 | 9/1957 | Shaw et al. | 285—226 X |
| 2,836,439 | 5/1958 | Moore | 285—279 |
| 3,403,949 | 10/1968 | Leissner | 308—187.1 |

FOREIGN PATENTS

| | | |
|---|---|---|
| 660,353 | 4/1963 | Canada. |
| 958,505 | 5/1964 | Great Britain. |
| 159,087 | 6/1957 | Sweden. |

THOMAS F. CALLAGHAN, Primary Examiner

U.S. Cl. X.R.

308—174